US011571639B2

(12) United States Patent
Virtanen

(10) Patent No.: US 11,571,639 B2
(45) Date of Patent: Feb. 7, 2023

(54) SYSTEM FOR PREVENTING GAS BUBBLES IN OIL FLOW TO ENTER A HIGH-VOLTAGE DEVICE AND A METHOD FOR PREVENTING GAS BUBBLES TO ENTER A HIGH-VOLTAGE DEVICE

(71) Applicant: Vaisala Oyj, Helsinki (FI)

(72) Inventor: Sami Virtanen, Helsinki (FI)

(73) Assignee: Vaisala Oyj, Helsinki (FI)

( * ) Notice: Subject to any disclaimer, the term of this patent is extended or adjusted under 35 U.S.C. 154(b) by 208 days.

(21) Appl. No.: 16/605,769

(22) PCT Filed: Apr. 26, 2018

(86) PCT No.: PCT/FI2018/050304
§ 371 (c)(1),
(2) Date: Oct. 16, 2019

(87) PCT Pub. No.: WO2018/202945
PCT Pub. Date: Nov. 8, 2018

(65) Prior Publication Data
US 2021/0121797 A1     Apr. 29, 2021

(30) Foreign Application Priority Data
May 3, 2017   (EP) .................................... 17169175

(51) Int. Cl.
*B01D 19/00*   (2006.01)
*H01F 27/12*   (2006.01)

(52) U.S. Cl.
CPC ..... *B01D 19/0042* (2013.01); *B01D 19/0063* (2013.01); *B01D 19/0031* (2013.01); *H01F 27/12* (2013.01)

(58) Field of Classification Search
CPC ................ B01D 19/00; B01D 19/0042; B01D 19/0063; B01D 19/0031; H01F 27/12
See application file for complete search history.

(56) References Cited

U.S. PATENT DOCUMENTS

| 3,561,193 | A | | 2/1971 | Baranowski | |
| 4,498,992 | A | | 2/1985 | Garrett, Jr. | |
| 5,976,226 | A | * | 11/1999 | Bastian | H01F 27/14 |
| | | | | | 174/12 R |
| 6,391,096 | B1 | * | 5/2002 | Waters | B01D 19/0031 |
| | | | | | 73/19.02 |
| 7,022,225 | B1 | * | 4/2006 | Clawson | B01D 19/0063 |
| | | | | | 210/188 |

(Continued)

FOREIGN PATENT DOCUMENTS

| CN | 202422923 U | * | 9/2012 | ............ H01F 27/14 |
| CN | 202422923 U | | 9/2012 | |

(Continued)

OTHER PUBLICATIONS

CN-202422923-U_English (Year: 2012).*

(Continued)

*Primary Examiner* — Youngsul Jeong
(74) *Attorney, Agent, or Firm* — Maschoff Brennan; Paul G. Johnson

(57) ABSTRACT

The disclosure relates to a system for preventing gas bubbles in oil flow to enter a high-voltage device, which system is located in flow direction of the oil before the high-voltage device and comprises a gravitational gas bubble filter in which velocity of the oil flow is decreased by an enlargement of space for the oil flow and in which the gas bubbles in the oil are separated from the oil flow based on the effect of gravity. The invention also relates to a method for preventing gas bubbles in oil flow to enter a high-voltage device, in which method velocity of the oil flow is decreased by an enlargement of space for the oil flow and the gas bubbles of the oil flow are separated from the oil flow based on the effect of gravity.

6 Claims, 1 Drawing Sheet

(56) References Cited

U.S. PATENT DOCUMENTS

| | | | |
|---|---|---|---|
| 7,785,400 | B1 | 8/2010 | Worley et al. |
| 9,173,987 | B2 * | 11/2015 | Meyer ..................... A61M 1/16 |
| 2006/0034705 | A1 | 2/2006 | Tessien et al. |
| 2008/0010956 | A1 | 1/2008 | Fogelman et al. |
| 2016/0199756 | A1 | 7/2016 | Saint-Vincent |
| 2016/0375386 | A1 | 12/2016 | Magnus et al. |

FOREIGN PATENT DOCUMENTS

| | | |
|---|---|---|
| DE | 2723111 A1 | 12/1978 |
| EP | 2 801 397 A1 | 11/2014 |
| WO | 2016/027003 A1 | 2/2016 |

OTHER PUBLICATIONS

Office Action dated Mar. 18, 2020 in European Patent application No. 17169175.1.
Office Action dated Nov. 5, 2019 in European Patent application No. 17169175.1.
Extended European Search Report dated Jun. 19, 2017 as received in Application No. 17169175.1.
EP Office Action dated Jun. 4, 2019 as received in Application No. 17169175.1.
PCT/FI2018/050304 International Search Report and Written Opinion dated Jun. 4, 2018.

* cited by examiner

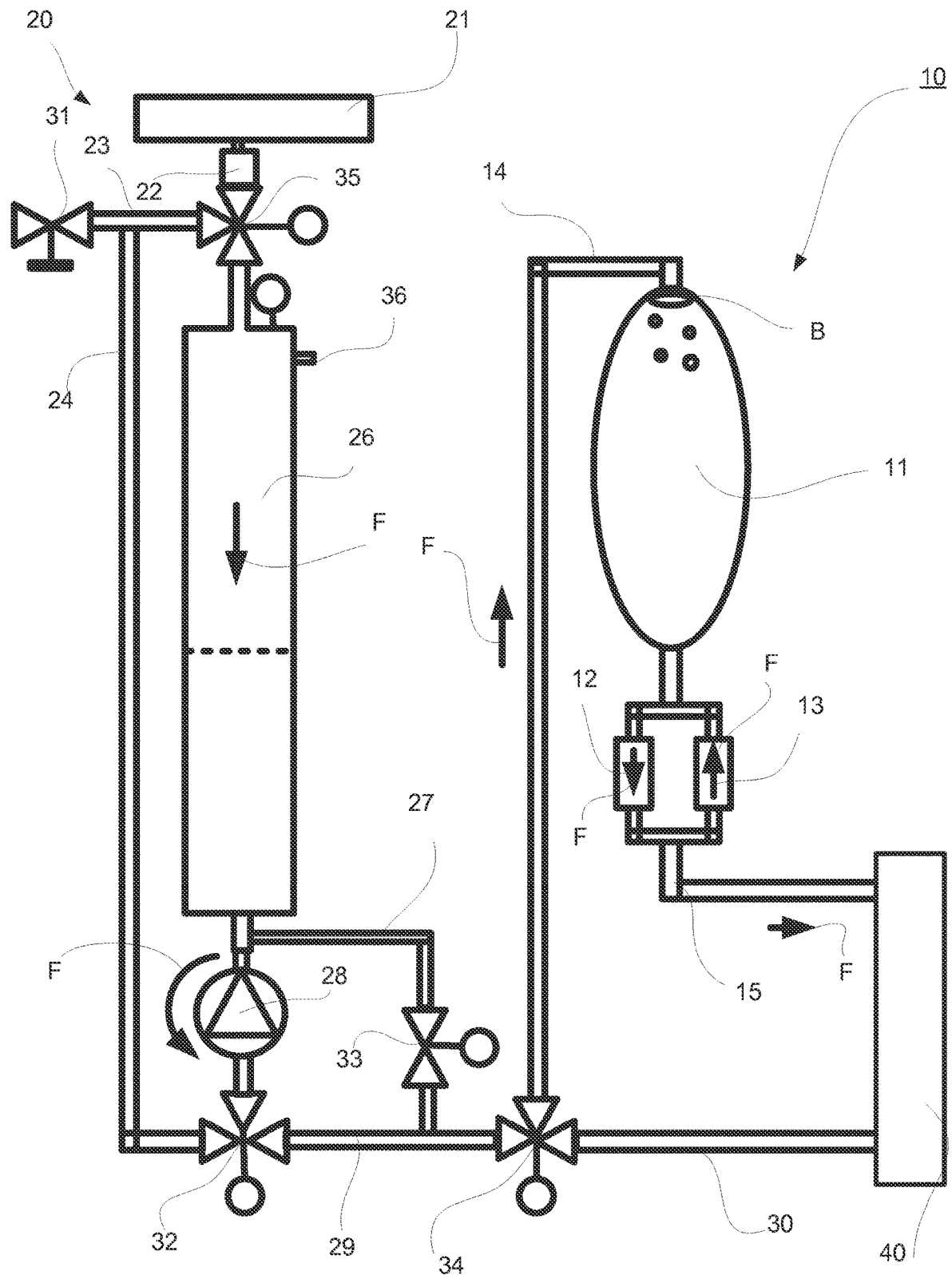

SYSTEM FOR PREVENTING GAS BUBBLES IN OIL FLOW TO ENTER A HIGH-VOLTAGE DEVICE AND A METHOD FOR PREVENTING GAS BUBBLES TO ENTER A HIGH-VOLTAGE DEVICE

CROSS-REFERENCE TO RELATED APPLICATION

This application is a National Phase Patent Application of International Patent Application Number PCT/FI2018/050304, filed on Apr. 26, 2018, which claims priority of European Patent Application Number 17169175.1, filed on May 3, 2017.

FIELD

The disclosure relates generally to a system and a method in separating gas from oil of a high-voltage device for performing dissolved gas analysis. Particularly the disclosure relates to a system for preventing gas bubbles in oil returning from a dissolved gas analysis system to enter a high-voltage device and to a method for preventing bubbles in oil returning from dissolved gas analysis to enter a high-voltage device. More particularly the disclosure relates to a system according to the preamble part of the independent system claim and to a method according to the preamble part of the independent method claim.

BACKGROUND

As known from the prior art dissolved gas analysis devices are used in analysis of gases dissolved in liquids, for example in oil, in industrial and environmental applications, especially online dissolved gas analysis devices for continuous monitoring of liquid-, in particular oil-filled devices, for example high-voltage devices such as high-voltage transformers and switchgear. An important example is the online condition monitoring of large power transformers, which is mainly based on transformer oil dissolved gas analysis. These online dissolved gas analysis devices are connected to the device the liquid of which is to be analyzed, and liquid transfer means such as liquid pumps, bellows or hydrostatic pressure differences are used to transfer oil samples between the device and the analyzer. In the oil analysis different methods for separating the dissolved gases from oil are used; in so-called extraction method, dissolved gases are separated from the oil at very low pressures, resulting in almost complete degassing of the oil sample. In the so-called head-space method, oil is equilibrated with gas phase at pressures near the dissolved gas vapor pressure of the oil. In the latter method, only a small portion of dissolved gases are extracted from oil, and the resulting gas volume concentrations depend on the dissolution coefficients of corresponding gases into the oil. Typically in both methods the equilibration process is speeded up by using mechanical agitation.

In publication WO 2016027003 A1 is disclosed a system for extracting gas from a liquid for performing dissolved gas analysis, the system comprising a container for storing a liquid and/or a gas, a liquid pump which is connected to the container, a means for feeding the system with a liquid and emptying the system of the liquid, a gas analyzer which is connected to the container, and a piping which is connected to the container, and wherein the piping, the liquid pump and the container are configured to be able to circulate the liquid. In this publication WO 2016027003 A1 is also disclosed a method for extracting gas from a liquid for performing dissolved gas analysis, the method comprising the steps of extracting the gas from the liquid utilizing mechanical agitation and pressure substantially reduced from ambient pressure, transferring the extracted gas into a gas analyzer, and dissolving the gas back into the liquid.

Gas separation from the oil and transfer of the oil is prone to generate gas bubbles into the oil. It is very important to prevent these bubbles from entering the high-voltage devices, because they may accumulate over time and form larger gas pockets in the oil, which may even compromise required insulation barriers to prevent arcing.

SUMMARY

An object of this disclosure is to create a system for preventing gas bubbles in oil returning from a dissolved gas analysis system to enter a high-voltage device and to create a method for preventing bubbles in oil returning from dissolved gas analysis to enter a high-voltage device and thus prevent the above-mentioned risks.

An additional object of the disclosure is to create a system for minimizing the amount of gas bubbles in oil transferred from a system for separating gas from a liquid for performing dissolved gas analysis back to a high-voltage device.

In particular an object of the disclosure is to provide an improved system for preventing gas bubbles in oil returning from a dissolved gas analysis system to enter a high-voltage device and an improved method for preventing gas bubbles in oil returning from dissolved gas analysis to enter a high-voltage device.

Advantageous embodiments and features of the disclosure are disclosed in the claims.

In this description and the following claims by term "gravitational gas bubble filter" is meant a part or a device or a vessel or a container or a channel in an oil flow system, in which velocity of the oil flow is decreased by an enlargement of space for the oil flow and in which the gas bubbles in the oil are separated from the oil flow based on the effect of gravity, which causes the gas bubbles to move upwards and unite to form gas pockets. Advantageously the gravitational gas bubble filter is an oil vessel with an oil inlet at the upper part of the vessel and an oil outlet at the lower part of the vessel and in which vessel the velocity of the oil flow decreases or even stops such that by the effect of gravity the gas bubbles in the oil rise above the oil level in the vessel and unite to form gas pockets in the oil. If the density of the liquid entering a gravitational gas bubble filter at its upper part exceeds the average density of the liquid in the filter, the incoming fluid can form a narrow 'flow channel' through the filter. In such a case the flow velocity is typically not reduced to a level that guarantees proper separation of the gas bubbles, and the efficiency of the filter is poor. This risk can be avoided by controlling the relative temperatures of the incoming fluid and the fluid in the filter volume. Typically the thermal expansion coefficient of the fluid is positive, resulting in decreasing density with increasing temperature, and it is thus preferable and sufficient to ensure that the incoming fluid temperature is not lower than the average temperature of the fluid in the gravitational gas bubble filter.

According to an advantageous example of the disclosure the system and the method are utilized for an oil-filled high-voltage device such as a high-voltage transformer and comprises a gravitational gas bubble filter for preventing gas bubbles in the oil returning from the dissolved gas analysis to enter the oil-filled high voltage device, and means to control the temperature of the oil flow such that suitable temperature difference between the oil in the vessel of the gravitational gas bubble filter and the oil entering the gravitational gas bubble filter is provided for ensuring optimal operation of the filter when oil is transferred through the gravitational gas bubble filter.

In addition to be able to separate gas bubbles from the liquid flow towards the analyzed device, it is preferable in the first place to minimize the bubble formation in transferring the liquid. Bubble formation can be reduced by increasing the liquid pressure: If the liquid pressure is below or near the dissolved gas vapor pressure, even small turbulences in the fluid flow can lead to bubble formation. Vice versa, if the pressure clearly exceeds the dissolved gas vapor pressure, bubble formation is small. Consequently, to minimize bubble formation in conjunction with the gravitational gas bubble filter, it is preferable to use means to increase the liquid pressure in and in the flow direction before the gravitational filter. This can be achieved with a liquid flow restricting means preferably after the gravitational filter. In addition to reducing bubble formation in the flow direction before the gravitational filter, the increased pressure in the filter has an advantage of at least partially dissolving the filtered gas bubbles into the oil, thus reducing the total amount of gas collected in the bubble filter.

According to an advantageous example of the disclosure the system comprises an oil vessel as the gravitational gas bubble filter positioned between the gas analyzer system and the high-voltage device in respect of the oil flow, an oil flow generating means and means to create a counter pressure to the oil flow generating means between the gravitational gas bubble filter and the high-voltage device, and control means of the oil flow between the gas analyzer system and the high-voltage device.

Advantageously in an advantageous example of the disclosure the oil entering the oil vessel of the gravitational gas bubble filter is warmed to a temperature higher than the average oil temperature in the oil vessel of the gravitational gas bubble filter, for example by thermalizing the separation oil vessel of the gas analyzer system above temperatures of the oil in the oil vessel of the gravitational gas bubble filter. This guarantees that the oil entering the oil vessel has smaller density than the oil already in there.

According to advantageous features of the disclosure the gravitational gas bubble filter is a vessel filled with oil, and having a space for decreasing oil flow velocity gas bubbles in oil rise to the top of the oil vessel and are separated from the oil flow and prevented to enter the high-voltage device. The oil vessel advantageously comprises an inlet opening on top part of the vessel and outlet opening at the bottom part of the oil vessel. Thus in a while after the oil has entered the oil vessel i.e. after a settling time, typically e.g. about 2-3 minutes, all gas bubbles in the oil have risen to the top part of the filtering vessel. Naturally, the settling time depends on the volume and shape of the oil vessel, viscosity of the oil etc. Preferably, the top part of the vessel has upwards narrowing shape, for example a conical or a cone-like shape, that collects the rising gas bubbles at an inlet piping connection. The gas bubbles rising in the oil vessel combine to form a gas pocket advantageously at the inlet connection of the oil vessel, and this/these gas pocket/s is/are removed for example by suction from the filtering oil vessel into the analyzer device to be dissolved back into the oil or vented out of the device.

According to the disclosure the system for preventing gas bubbles in oil flow to enter a high-voltage device is located in flow direction of the oil before the high-voltage device and comprises a gravitational gas bubble filter, in which velocity of the oil flow is decreased by an enlargement of space for the oil flow and in which gas bubbles in the oil are separated from the oil flow based on the effect of gravity, which advantageously causes the gas bubbles to move upwards, to unite and to form gas pockets.

According to an advantageous feature of the disclosure the system is located in respect of the oil flow between a dissolved gas analysis system used for analyzing the gas of oil of the high-voltage device and the high-voltage device.

According to an advantageous feature of the disclosure in the system the gravitational gas bubble filter is an oil vessel with an oil inlet at the upper part of the vessel and an oil outlet at the lower part of the vessel located in the channel for oil flow and in which oil vessel the velocity of the oil flow decreases, possibly the oil flow even stops such, that by the effect of gravity the gas bubbles are separated from the oil flow, advantageously such, that by the effect of gravity the gas bubbles in the oil rise above the oil level in the vessel and are separated from the oil flow.

According to an advantageous feature of the disclosure the system comprises means to control temperature of the oil entering the gravitational gas bubble filter or the temperature of the gravitational gas bubble filter itself or both.

According to an advantageous feature of the disclosure the system further comprises an oil flow generating means and means to generate counter pressure to the oil flow generating means.

According to an advantageous feature of the disclosure the means to generate counter pressure can be a pressure regulator located between the gravitational gas bubble filter and the high-voltage device.

According to an advantageous feature of the disclosure in the system the pressure regulator is spring loaded.

According to an advantageous feature of the disclosure in system the oil vessel has upwards narrowing shape, for example a conical or a cone-like shape.

According to an advantageous feature of the disclosure the gravitational gas bubble filter comprises an oil vessel positioned in respect of the oil flow between the dissolved gas analyzer device and the high-voltage device in respect of the oil flow in the return flow path of the oil.

According to an advantageous feature of the disclosure the system comprises means to create counter pressure, for example a pressure regulator or a throttle or a choke or a corresponding pressure reducing or throttling device between the gravitational gas bubble filter and the high-voltage device.

According to an advantageous feature of the disclosure the system comprises automatized control means to control the oil flow between the dissolved gas analyzer system and the high-voltage device.

According to an advantageous feature of the disclosure the system comprises means to control temperature of the oil flow entering the gravitational gas bubble filter such that the temperature of the oil entering the gravitational gas bubble filter is not lower than the average temperature of the oil in the gravitational gas bubble filter.

According to an advantageous feature of the disclosure pressure in the gravitational gas bubble filter is above the dissolved gas vapor pressure of the oil.

According to an advantageous feature of the disclosure volume of the oil vessel of the gravitational gas bubble filter is not considerably smaller than the volume of the oil to be pumped continuously through the gas bubble filter.

According to an advantageous feature of the disclosure the high-voltage device is a transformer.

According to the disclosure in the method for preventing gas bubbles in oil flow to enter a high-voltage device velocity of the oil flow is decreased by an enlargement of space for the oil flow and the gas bubbles of the oil flow are separated from the oil flow based on the effect of gravity, which advantageously causes the gas bubbles to move upwards and form gas bubble pockets in the upper part of the gravitational gas bubble filter.

According to an advantageous feature of the disclosure in method velocity of the oil flow is decreased by gravitational gas bubble filter formed as an oil vessel with an oil inlet at the upper part of the vessel and an oil outlet at the lower part of the vessel located in the channel for oil flow and in which oil vessel the velocity of the oil flow decreases or the oil flow even stops such, that by the effect of gravity the gas bubbles are separated from the oil flow, advantageously such, that by the effect of gravity the gas bubbles in the oil rise above the oil level in the vessel and unite, and the gas contained by them is separated from the oil flow.

According to an advantageous feature of the disclosure in method temperature of the oil flow is adjusted to desired temperature before it enters the gravitational gas bubble filter.

According to an advantageous feature of the disclosure in method counter pressure to the oil flow is created at the outlet side of the gravitational gas bubble filter.

By the disclosure and its advantageous features many advantages are achieved. The gas bubble injection to the oil volume of the high-voltage equipment analyzed in online dissolved gas analysis device can be eliminated. With the help of system and method described above also cavitation of the fluid pump, if used as means for transferring the oil, can be considerably reduced by arranging according to the advantageous feature of the disclosure an increased counter pressure, advantageously by using a spring loaded check valve, in between the filtering chamber and the transformer. Proper temperature difference for the oil entering the gravitational gas bubble filter vessel and the oil already present in the vessel ensures the optimal operation of the bubble filter.

In addition in cases where oil pumps are used for transfer of the oil, the tendency of the oil pumps to cavitation causing gas bubbles in the pumped oil, can in certain conditions be considerably reduced by increasing counter pressure to the pump at the output side of the filter vessel according to an advantageous feature of the disclosure due to the relative magnitudes of oil's dissolved gas vapor pressure and the output side pressure: oil turbulences within the pump do not lead to gas separation if the output side pressure is clearly higher than the dissolved gas pressure.

BRIEF DESCRIPTION OF THE DRAWINGS

In the following the proposed solution is explained in detail in an example case with reference to the accompanying drawing to which the proposed solution is not to be narrowly limited.

In the FIG. is schematically shown an example of a system for separating gas from oil for performing dissolved gas analysis comprising a system for preventing gas bubbles in oil to enter a high-voltage device according to an advantageous example of the invention.

DETAILED DESCRIPTION

During the course of the following description like numbers and signs will be used to identify like elements according to the FIGURE which illustrates the proposed solution and its advantageous example.

In the FIG. is shown an example of a system 20 for separating gas from oil for performing dissolved gas analysis, which comprises a system 10 for preventing gas bubbles in oil to enter a high-voltage device 40 according to an advantageous example of the disclosure. The system 20 for separating gas from oil for performing dissolved gas analysis in this example is based on the extraction method, in which dissolved gases are separated from the oil using low pressure, and enhancing the separation by flushing the oil in gas-tight volume partially filled with oil. This system 20 is substantially similar as described in publication WO2016027003A1.

The system for separating gas from oil for performing dissolved gas analysis can also be based on the head-space method.

The system 20 for separating gas from oil for performing dissolved gas analysis as shown in the example of the FIG. is vacuum tight and comprises a gas analyzer 21 and a container 26. The container 26 is connected to means 28 for creating the oil flow, in this example a two-way oil pump 28, at one end, which oil pump 28 is connected to a first three-way valve 32, and the container 26 to a second three-way valve 35 at the other end. Advantageously the oil pump 28 is a bidirectional pump with an adjustable pumping rate. The second three way valve 35 is in one direction connected to a gas/oil separation vessel 22, which is connected to the analyzer 21. In the other direction the second three-way valve 35 is connected to the first three-way valve 32 via piping or channel 24 and to a valve 31 via the piping or channel 24. The gas/oil separation vessel 22 is configured in such a way that oil droplets, and/or aerosol cannot pass the gas/oil separation vessel 22 and only gas is allowed to enter the analyzer 21. The analyzer 21 may be, for example, an IR absorption gas measurement chamber. The first three-way valve 32 is further connected to a piping or channel 29. Between the container 26 and the oil pump 28 a piping connection 27 is arranged with a second valve 33. The piping connection 27 is at the other end connected to the piping 29. The third three-way valve 34 is also connected to the inlet/outlet piping or channel 30. The container 26 furthermore comprises means 36 for measuring oil level in the container 26, which means 36 may be based for example on an optical, mechanical or acoustical oil level measurement technique. The inlet/outlet piping or channel 30 is connected to the high-voltage device 40, for example to a high-voltage transformer, containing the oil to be analyzed. In the FIGURE by arrows F is indicated main flow directions of the oil.

As shown in the example of the FIGURE the system 10 for preventing gas bubbles in oil to enter a high-voltage device 40 according to an advantageous example of the disclosure comprises a gravitational gas bubble filter 11 between the system 20 for separating gas from oil for performing dissolved gas analysis and the high voltage device 40 and in this example the system for preventing gas bubbles to enter the high-voltage device 40 is connected by piping or channel 14 for the oil flow to the oil pump 28 of the system 20 and via the oil pump 28 to the container 26. The gravitational gas bubble filter 11 is an oil vessel 11 positioned between the system 20 in respect of the oil flow for separating gas from oil for performing dissolved gas analysis and the high-voltage device 40. The gravitational gas bubble filter 11 is in this example the oil vessel 11, in which velocity of the oil flow is decreased by an enlargement of space provided by the oil vessel 11 for the oil flow and in which the gas bubbles of the oil are separated from the oil flow based on the effect of gravity, which causes the gas bubbles to move upwards and unite to form gas bubble pockets B at the top of the vessel 11. The oil vessel 11 forming the gravitational gas bubble filter 11 comprises an oil inlet at the upper part of the vessel 11 and an oil outlet at the lower part of the vessel 11 connected to the channel 15 for the oil flow to the high-voltage device 40. In the oil vessel lithe velocity of the oil flow slows down such that by the effect of gravity the gas bubbles in the oil rise above the oil level in the vessel 11, form gas bubble pockets B and are separated from the oil flow in the vessel 11. In this example the system 10 for preventing gas bubbles in oil to enter a high-voltage device 40 comprises also means 12, 13 to create counter pressure, for example a pressure regulator 12, 13 or a throttle between the gravitational gas bubble filter 10 and the high-voltage device 40 in respect of the oil flow and automatized control (not shown) of the oil flow between the oil pump 28 and the high-voltage device 40. The system 10 for preventing gas bubbles in oil to enter a high-voltage device 40 further comprises advantageously means to control temperature of the oil such that the oil entering the oil vessel 11 via the channel 14 from at the top located inlet of the oil vessel 11 is higher than the average oil temperature already present in the vessel. 11 This can be achieved for example by thermalizing the container 26 above temperatures of the filtering vessel 11.

In the following the disclosure is further explained with reference to an example where the system and the method according to the disclosure are in connection with oil filled, high-voltage transformer 40 to which the features of the disclosure are not to be narrowly limited. The gravitational gas bubble filter 11 is the oil vessel 11 filled with oil, and has sufficient width and height such that oil flow velocity decreases to such a level that even very small gas bubbles in oil rise to the top of the vessel 11 and unite to form a gas bubble pocket B. The vessel 11 is configured so that when oil flow is towards the transformer 40, oil enters the filtering vessel 11 at the top and leaves the vessel 11 at the bottom. Advantageously the incoming oil is warmer and thus has smaller density than the oil already in the vessel 11. This density difference ensures that incoming oil does not form a narrow flow channel directly through the oil in the oil vessel 11. The warmer incoming oil and the bubbles it contains are layered above the bubble-free oil already present in the oil vessel 11, the layer boundary proceeding downwards as oil is flown through the vessel 11. Preferably the filter vessel volume is large enough so, that it can approximately accommodate all the oil that is flown through it in one continuous pumping action. In a while after the cycle has finished, all gas bubbles in the oil have risen to the top part of the oil vessel 11. Preferably, the top part of the vessel 11 has a form that collects all rising gas bubbles at the inlet piping connection, advantageously the form is upwards narrowing shape, for example a conical or a cone-like shape. The gas bubbles combine to form a gas pocket B, and the gas pocket B is removed, for example sucked off via channel 14 from the oil vessel 11 into vessel 26 to be dissolved back into the oil.

The means 12, 13 to create the counter pressure in this example comprises spring loaded check valves 12, 13 in between the oil vessel 11 and the high-voltage device 40. This parallel check valve configuration can be used to allow also oil and gas intake from the oil vessel 11 into vessel 26. The opening pressures of the check valves 12, 13 are optimized and differ from each other.

Above only some advantageous examples of the disclosure have been described to which examples the disclosure is not to be narrowly limited and many modifications and alterations are possible within the disclosure.

The invention claimed is:

1. A system for preventing gas bubbles in oil flow to enter a high-voltage device, wherein the system is located in a flow direction of the oil before the high-voltage device and comprises:
   a gravitational gas bubble filter in which velocity of the oil flow is decreased by an enlargement of space for the oil flow and in which gas bubbles in the oil are separated from the oil flow based on an effect of gravity;
   means to control temperature of the oil entering the gravitational gas bubble filter or temperature of the gravitational gas bubble filter itself, or both such that the temperature of the oil entering the gravitational gas bubble filter is not lower than an average temperature of the oil in the gravitational gas bubble filter;
   an oil pump positioned in respect of the oil flow upstream of the gravitational gas bubble filter; and
   means to generate counter pressure to the oil pump, the means to generate counter pressure positioned in respect of the oil flow downstream of the gravitational gas bubble filter and upstream of the high-voltage device.

2. The system according to claim 1, wherein the system is located in respect of the oil flow between a dissolved gas analysis system used for analyzing the gas dissolved in oil of the high-voltage device and the high-voltage device.

3. The system according to claim 1, wherein the gravitational gas bubble filter is an oil vessel with an oil inlet at an upper part of the oil vessel and an oil outlet at a lower part of the oil vessel located in a channel for oil flow and in which oil vessel the velocity of the oil flow decreases such that by the effect of gravity the gas bubbles are separated from the oil flow.

4. The system according to claim 1, wherein the means to generate counter pressure is a pressure regulator.

5. The system according to claim 4, wherein the pressure regulator comprises a spring loaded check valve or valves.

6. The system according to claim 3, wherein the oil vessel has an upwards narrowing shape.

* * * * *